United States Patent
Yan

(10) Patent No.: US 11,526,495 B2
(45) Date of Patent: Dec. 13, 2022

(54) METHOD AND APPARATUS FOR PROCESSING WRITE-AHEAD LOG

(71) Applicant: Huawei Technologies Co., Ltd., Shenzhen (CN)

(72) Inventor: Xiaolin Yan, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 219 days.

(21) Appl. No.: 16/909,429

(22) Filed: Jun. 23, 2020

(65) Prior Publication Data
US 2020/0320065 A1   Oct. 8, 2020

Related U.S. Application Data

(63) Continuation of application No. PCT/CN2017/120118, filed on Dec. 29, 2017.

(51) Int. Cl.
*G06F 16/23* (2019.01)
*G06F 16/22* (2019.01)
*G06F 16/28* (2019.01)

(52) U.S. Cl.
CPC ...... *G06F 16/2379* (2019.01); *G06F 16/2246* (2019.01)

(58) Field of Classification Search
CPC ............ G06F 16/2379; G06F 16/2246; G06F 16/2365; G06F 16/28
See application file for complete search history.

(56) References Cited

U.S. PATENT DOCUMENTS

| 8,700,670 | B2 | 4/2014 | Marathe et al. | |
| 8,977,898 | B1* | 3/2015 | Veeraswamy | G06F 11/1471 714/15 |
| 2011/0252099 | A1* | 10/2011 | Pattekar | G06F 16/2365 709/204 |
| 2014/0156618 | A1* | 6/2014 | Castellano | G06F 16/2308 707/703 |
| 2015/0227573 | A1 | 8/2015 | Castellano | |
| 2015/0286671 | A1* | 10/2015 | Ebiyama | G06F 11/1474 707/692 |
| 2017/0161310 | A1* | 6/2017 | Chao | G06F 16/278 |

FOREIGN PATENT DOCUMENTS

| CN | 104657500 A | 5/2015 |
| CN | 104809178 A | 7/2015 |
| CN | 103502970 B | 1/2016 |
| CN | 106708427 A | 5/2017 |

OTHER PUBLICATIONS

XP055738137, C. Mohan, "Ariesikvl: A Key-Value Locking Method for Concurrency Control of Multiaction Transactions Operating on B-Tree Indexes," Proceedings of the 16th VLDB Conference, Brisbane, Australia, Aug. 1990, 14 pages.

* cited by examiner

*Primary Examiner* — Robert W Beausoliel, Jr.
*Assistant Examiner* — Mohammad S Bhuyan
(74) *Attorney, Agent, or Firm* — Conley Rose, P.C.

(57) ABSTRACT

A method and apparatus for processing a write-ahead log (WAL) in a storage device that records a WAL set key-value pair and a status key-value pair include determining a status of the WAL set key-value pair based on the status key-value pair, replaying all uncompleted WALs in the WAL set key-value pair when the status of the WAL set key-value pair is in a sealed state, modifying, in the status key-value pair, the status of the WAL set key-value from the sealed state to a completed state, and deleting the WAL set key-value pair in the completed state.

20 Claims, 8 Drawing Sheets

METHOD AND APPARATUS FOR PROCESSING WRITE-AHEAD LOG

CROSS-REFERENCE TO RELATED APPLICATIONS

This application is a continuation of International Patent Application No. PCT/CN2017/120118 filed on Dec. 29, 2017, which is hereby incorporated by reference in its entirety.

TECHNICAL FIELD

This disclosure relates to the storage field, and in particular, to a method and an apparatus for processing a write-ahead log (WAL).

BACKGROUND

In a storage device based on key-value (KV) storage, a WAL is stored in a data structure of a key-value pair. FIG. 1 shows an organizational structure of the WAL in the storage device. It can be seen from the organizational structure shown in FIG. 1 that the WAL is stored in an organizational structure of a tree map. The tree map includes a plurality of root blocks and a plurality of leaf blocks, and each root block corresponds to one leaf block. The leaf block is configured to store the WAL and an execution result of a transaction recorded in the WAL. When the execution result is "completed", it indicates that the transaction recorded in the WAL is successfully executed. When the execution result is "uncompleted", it indicates that the transaction recorded in the WAL is not successfully executed, and needs to be replayed. The root block is configured to store information about the leaf block. For example, the root block stores a value range of a key of the WAL in the leaf block and a storage address of the corresponding leaf block.

In the organizational structure of the WAL shown in FIG. 1, each WAL corresponds to one execution result. In a process of replaying or deleting the WAL in the storage device, a replay or deletion operation needs to be performed on the WAL after whether WALs meet a replay condition or a deletion condition is determined one by one. However, in this manner of performing a replay or deletion operation on the WALs one by one based on execution results of the WALs, the process of replaying or deleting the WALs is relatively complex.

SUMMARY

This disclosure provides a method and an apparatus for processing a WAL, to simplify a process of replaying or deleting a WAL stored in a storage device.

According to a first aspect, a method for processing a WAL is provided. The method is applied to a storage device, the storage device records a plurality of WAL set key-value pairs and a status key-value pair, each of the plurality of WAL set key-value pairs is used to record a plurality of WALs, the status key-value pair is used to record statuses of at least some of the plurality of WAL set key-value pairs, and statuses of the plurality of WAL set key-value pairs include a completed state or a sealed state, where a WAL set key-value pair in the sealed state is forbidden to record a new WAL, and execution of all WALs in a WAL set key-value pair in the completed state is completed, and the method includes determining a status of a to-be-processed target WAL set key-value pair in the at least one WAL set key-value pair from the status key-value pair, for a target WAL set key-value in the sealed state, reading the target WAL set key-value pair, replaying all uncompleted WALs in the target WAL set key-value pair, and after the replay is completed, modifying a status of the target WAL set key-value to the completed state, and deleting the target WAL set key-value pair in the completed state.

Further, the status key-value pair may be at least one status key-value pair.

It should be noted that, the replaying all uncompleted WALs in the target WAL set key-value pair may be replaying a WAL corresponding to a transaction that is recorded in a WAL in the target WAL set key-value pair and whose execution result is "uncompleted". A WAL corresponding to a transaction that is recorded in a WAL in the target WAL set key-value pair and whose execution result is "completed" may not need to be replayed.

It should be further understood that, that the replay is completed may be that execution results of transactions recorded in all to-be-replayed WALs in the WAL set key-value pair are all "completed". The to-be-replayed WAL may be the foregoing WAL corresponding to the transaction that is recorded in the WAL and whose execution result is "uncompleted".

In this embodiment of this disclosure, the plurality of WALs are stored in the WAL set key-value pair, and the WALs stored in the WAL set key-value pair are processed at a granularity of the WAL set key-value pair based on a WAL set key-value pair status stored in the status key-value pair, thereby avoiding a problem that WALs can only be processed one by one, and helping simplify a process of replaying or deleting the WAL stored in the storage device.

According to an aspect, in the method in this embodiment of this disclosure, in the process of deleting the WAL, the WAL set key-value pair in the completed state may also be directly deleted, thereby avoiding a problem that WALs need to be determined one by one in a process of deleting the WALs because each WAL corresponds to one execution result, and helping simplify the process of deleting the WAL stored in the storage device.

According to another aspect, in the method in this embodiment of this disclosure, in a process of replaying the WAL, an entire WAL set key-value pair in the sealed state may be read at a time at a granularity of the WAL set key-value pair, and then a to-be-replayed WAL in the WAL set key-value pair in the sealed state is replayed, thereby avoiding a problem that WALs need to be determined and replayed one by one in a process of replaying the WALs because each WAL corresponds to one execution result, and helping simplify the process of replaying the WAL stored in the storage device.

With reference to the first aspect, in a possible implementation, the statuses of the plurality of WAL set key-value pairs may further include a working state, and a WAL set key-value pair in the working state is used to record a WAL newly received by the storage device.

With reference to the first aspect, in a possible implementation, that a WAL set key-value pair in the sealed state is forbidden to record a new WAL may be that a quantity of WALs stored in the WAL set key-value pair in the sealed state in the at least one WAL set key-value pair is equal to a maximum quantity of WALs stored in each of the at least one WAL set key-value pair, or a length of time in which the WAL set key-value pair in the sealed state is in the working state is equal to a preset time length.

With reference to the first aspect, in a possible implementation, a quantity of WALs stored in the WAL set key-value pair in the working state is less than the maximum quantity.

With reference to the first aspect, in a possible implementation, a value of each of the at least one status key-value pair includes keys of at least some of the at least one WAL set key-value pair, and WAL set key-value pair statuses corresponding to the keys of the at least some WAL set key-value pairs.

With reference to the first aspect, in a possible implementation, a value of each of the at least one WAL set key-value pair includes a plurality of WALs.

With reference to the first aspect, in a possible implementation, the storage device further stores a second cursor key-value pair, a WAL set key-value pair status recorded in a status key-value pair corresponding to the second cursor key-value pair includes the sealed state, and the determining a status of a to-be-processed target WAL set key-value pair in the at least one WAL set key-value pair from the status key-value pair further includes determining a second status key-value pair that is in the status key-value pair and that is currently corresponding to the second cursor key-value pair, where the second status key-value pair records the status of the target WAL set key-value pair, and determining, from a WAL set key-value pair status recorded in the second status key-value pair, that the status of the target WAL set key-value pair is the sealed state.

In this embodiment of this disclosure, the status key-value pair that records a WAL set key-value pair status including the sealed state is determined using the second cursor key-value pair and from the status key-value pair stored in the storage device, thereby helping improve efficiency of searching the status key-value pair stored in the storage device for the WAL set key-value pair in the sealed state.

With reference to the first aspect, in a possible implementation, the storage device further stores a third cursor key-value pair, a WAL set key-value pair status recorded in a status key-value pair corresponding to the third cursor key-value pair includes the completed state, and the determining a status of a to-be-processed target WAL set key-value pair in the at least one WAL set key-value pair from the at least one status key-value pair further includes determining a third status key-value pair that is in the status key-value pair and that is currently corresponding to the third cursor key-value pair, where the third status key-value pair records the status of the target WAL set key-value pair, and determining, from a WAL set key-value pair status recorded in the third status key-value pair, that the status of the target WAL set key-value pair is the completed state.

In this embodiment of this disclosure, the status key-value pair that records a WAL set key-value pair status including the completed state is determined using the third cursor key-value pair and from the status key-value pair stored in the storage device, thereby helping improve efficiency of searching the status key-value pair stored in the storage device for the WAL set key-value pair in the completed state.

With reference to the first aspect, in a possible implementation, after the replaying a WAL in the target WAL set key-value pair, the method further includes modifying, in the second status key-value pair, the status of the target WAL set key-value pair from the sealed state to the completed state.

With reference to the first aspect, in a possible implementation, after the deleting the target WAL set key-value pair, the method further includes modifying, in the third status key-value pair, the status of the target WAL set key-value pair from the completed state to a deleted state.

In the third status key-value pair, a status of a deleted WAL set key-value pair is marked as the deleted state such that more detailed information about the status of the WAL set key-value pair can be obtained subsequently by checking the status key-value pair.

With reference to the first aspect, in a possible implementation, the method further includes modifying the second cursor key-value pair that corresponds to the second status key-value pair to a fourth status key-value pair that corresponds to the at least one WAL set key-value pair, where the fourth status key-value pair is a next status key-value pair generated after the second status key-value pair.

With reference to the first aspect, in a possible implementation, the method includes modifying the third cursor key-value pair that corresponds to the third status key-value pair to a fifth status key-value pair that corresponds to the at least one WAL set key-value pair, where the fifth status key-value pair is a next status key-value pair generated after the third status key-value pair.

According to a second aspect, a method for processing a WAL is provided. The method is applied to a storage device, the storage device stores at least one WAL set key-value pair, the at least one WAL set key-value pair is used to store a plurality of WALs, and the method includes obtaining a first WAL that is to be stored into the storage device, selecting a first WAL set key-value pair from the at least one WAL set key-value pair based on a status of the at least one WAL set key-value pair, where a status of the first WAL set key-value pair is a working state, and a WAL set key-value pair in the working state is used to store a newly received WAL, and storing the first WAL into the first WAL set key-value pair.

In this embodiment of this disclosure, the plurality of WALs are stored in the WAL set key-value pair such that in a process of replaying or deleting the WAL, the WAL stored in the WAL set key-value pair can be replayed or deleted at a granularity of the WAL set key-value pair, thereby avoiding a other approaches problem that WALs can only be processed one by one, and helping simplify a process of replaying or deleting the WAL stored in the storage device.

With reference to the second aspect, in a possible implementation, a quantity of WALs stored in the WAL set key-value pair in the working state is less than a maximum quantity of WALs stored in each of the at least one WAL set key-value pair.

With reference to the second aspect, in a possible implementation, the storage device stores at least one status key-value pair, the at least one status key-value pair is used to store the status of the at least one WAL set key-value pair, and the selecting a first WAL set key-value pair from the at least one WAL set key-value pair based on a status of the at least one WAL set key-value pair includes selecting the first WAL set key-value pair from the at least one WAL set key-value pair based on the status that is of the at least one WAL set key-value pair and that is stored in the at least one status key-value pair.

In this embodiment of this disclosure, the status of the WAL set key-value pair is stored in the status key-value pair such that WAL set key-value pairs in different statuses can be directly searched for by querying the status key-value pair, and WALs in the WAL set key-value pairs in the different statuses are processed at a granularity of the WAL set key-value pair, thereby helping simplify a process of processing the WAL.

Further, the status key-value pair may store statuses of a plurality of WAL set key-value pairs, that is, a quantity of status key-value pairs is less than a quantity of WAL set key-value pairs. Therefore, when the status of the WAL set key-value pair is queried using the status key-value pair, time for querying the status of the WAL set key-value pair can be reduced.

With reference to the second aspect, in a possible implementation, the storage device stores a first cursor key-value pair, a WAL set key-value pair status recorded in a status key-value pair corresponding to the first cursor key-value pair includes the working state, and the selecting the first WAL set key-value pair from the at least one WAL set key-value pair based on the status that is of the at least one WAL set key-value pair and that is recorded in the at least one status key-value pair includes determining a first status key-value pair that is in the at least one status key-value pair and that is currently corresponding to the first cursor key-value pair, and selecting, from a WAL set key-value pair status recorded in the first status key-value pair, a WAL set key-value pair in the working state as the first WAL set key-value pair.

In this embodiment of this disclosure, the first cursor key-value pair corresponds to the WAL set key-value pair in the working state in the at least one status key-value pair, thereby helping improve efficiency of searching the at least one status key-value pair for the WAL set key-value pair in the working state.

With reference to the second aspect, in a possible implementation, a value of each of the at least one status key-value pair includes keys of at least some of the at least one WAL set key-value pair, and WAL set key-value pair statuses corresponding to the keys of the at least some WAL set key-value pairs.

With reference to the second aspect, in a possible implementation, a value of each of the at least one WAL set key-value pair includes a plurality of WALs.

With reference to the second aspect, in a possible implementation, the storage device further stores a second cursor key-value pair, a WAL set key-value pair status recorded in a status key-value pair corresponding to the second cursor key-value pair includes the sealed state, and the method further includes determining a second status key-value pair that is in the at least one status key-value pair and that is currently corresponding to the second cursor key-value pair, determining a WAL set key-value pair in the sealed state from a WAL set key-value pair status recorded in the second status key-value pair, and replaying a to-be-replayed WAL in the WAL set key-value pair in the sealed state, and when all WALs in the WAL set key-value pair in the sealed state are in a replay-completed state or a state indicating that replay is not required, modifying, in the second status key-value pair, the status of the WAL set key-value pair in the sealed state to the completed state.

Further, the foregoing to-be-replayed WAL may be a WAL corresponding to a transaction that is recorded in the WAL and whose execution result is "uncompleted".

In this embodiment of this disclosure, the second cursor key-value pair corresponds to the WAL set key-value pair in the sealed state in the at least one status key-value pair, thereby helping improve efficiency of searching the at least one status key-value pair for the WAL set key-value pair in the sealed state.

With reference to the second aspect, in a possible implementation, the storage device further records a third cursor key-value pair, a WAL set key-value pair status recorded in a status key-value pair corresponding to the third cursor key-value pair includes the completed state, and the method further includes determining a third status key-value pair that is in the at least one status key-value pair and that is currently corresponding to the third cursor key-value pair, and determining, from a WAL set key-value pair status recorded in the third status key-value pair, a WAL set key-value pair in the completed state in the third status key-value pair, and deleting the WAL set key-value pair in the completed state.

In this embodiment of this disclosure, the third cursor key-value pair corresponds to the WAL set key-value pair in the completed state in the at least one status key-value pair, thereby helping improve efficiency of searching the at least one status key-value pair for the WAL set key-value pair in the completed state.

With reference to the second aspect, in a possible implementation, after deleting the WAL set key-value pair in the completed state, the method further includes modifying, in the third status key-value pair, a status of the WAL set key-value pair in the completed state to the deleted state.

With reference to the second aspect, in a possible implementation, the method further includes modifying the second cursor key-value pair that corresponds to the second status key-value pair to a fourth status key-value pair that corresponds to the at least one WAL set key-value pair, where the fourth status key-value pair is a next status key-value pair generated after the second status key-value pair.

With reference to the second aspect, in a possible implementation, the method includes modifying the third cursor key-value pair that corresponds to the third status key-value pair to a fifth status key-value pair that corresponds to the at least one WAL set key-value pair, where the fifth status key-value pair is a next status key-value pair generated after the third status key-value pair.

With reference to the second aspect, in a possible implementation, a first concurrency identifier and a second concurrency identifier are preset in the storage device, the first WAL corresponds to the first concurrency identifier, the first WAL set key-value pair corresponds to the first concurrency identifier, the first status key-value pair stores a plurality of WAL set key-value pairs in the working state, the plurality of WAL set key-value pairs in the working state include the first WAL set key-value pair and a second WAL set key-value pair, and before the selecting the first WAL set key-value pair from the first status key-value pair corresponding to the first cursor key-value pair, the method further includes obtaining the second WAL set key-value pair that is to be stored into the storage device, where the second WAL set key-value pair corresponds to the second concurrency identifier, selecting the second WAL set key-value pair corresponding to the second concurrency identifier from the first status key-value pair corresponding to the first cursor key-value pair, and storing a second WAL into the second WAL set key-value pair in a process of storing the first WAL into the first WAL set key-value pair.

In this embodiment of this disclosure, different WAL set key-value pairs in the working state can be simultaneously selected for the plurality of to-be-stored WALs based on the concurrency identifiers such that the plurality of WALs can be simultaneously stored into the storage device, thereby helping improve WAL storage efficiency.

In an optional implementation, that the WAL set key-value pair is used to record a plurality of WALs may be understood as the WAL set key-value pair is used to store a plurality of WALs.

In an optional implementation, that the status key-value pair is used to record the WAL set key-value pair status may be understood as the status key-value pair is used to store the WAL set key-value pair status.

According to a third aspect, an apparatus for processing a WAL is provided, and the apparatus includes modules configured to perform the foregoing method.

According to a fourth aspect, a control apparatus is provided, and the control apparatus has functions of implementing the method design of the first aspect. These functions may be implemented by hardware, or may be implemented by hardware by executing corresponding software. The hardware or the software includes one or more units corresponding to the foregoing functions.

According to a fifth aspect, a controller is provided, and includes a processor and a memory. The processor is configured to control a transceiver to receive and send a signal, the memory is configured to store a computer program, and the processor is configured to invoke and run the computer program from the memory such that the processor performs the methods in the foregoing aspects.

According to a sixth aspect, a computer program product is provided, the computer program product includes computer program code, and when the computer program code is run on a computer, the computer performs the methods in the foregoing aspects.

According to a seventh aspect, a computer readable medium is provided, the computer readable medium stores program code, and when the computer program code is run on a computer, the computer performs the methods in the foregoing aspects.

According to an eighth aspect, a chip is provided, and the chip includes a processor configured to implement functions related to the foregoing aspects, for example, generate, receive, send, or process data and/or information used in the foregoing methods. In a possible design, the processor is coupled to a memory, and the memory is configured to store a necessary program instruction and data.

According to a ninth aspect, a chip system is provided, the chip includes a processor and a memory, and the processor is configured to implement functions related to the foregoing aspects, for example, generate, receive, send, or process data and/or information used in the foregoing methods. The memory is configured to store a necessary program instruction and data. The chip system may include a chip, or may include a chip and another discrete device.

DESCRIPTION OF EMBODIMENTS

Figure 1:
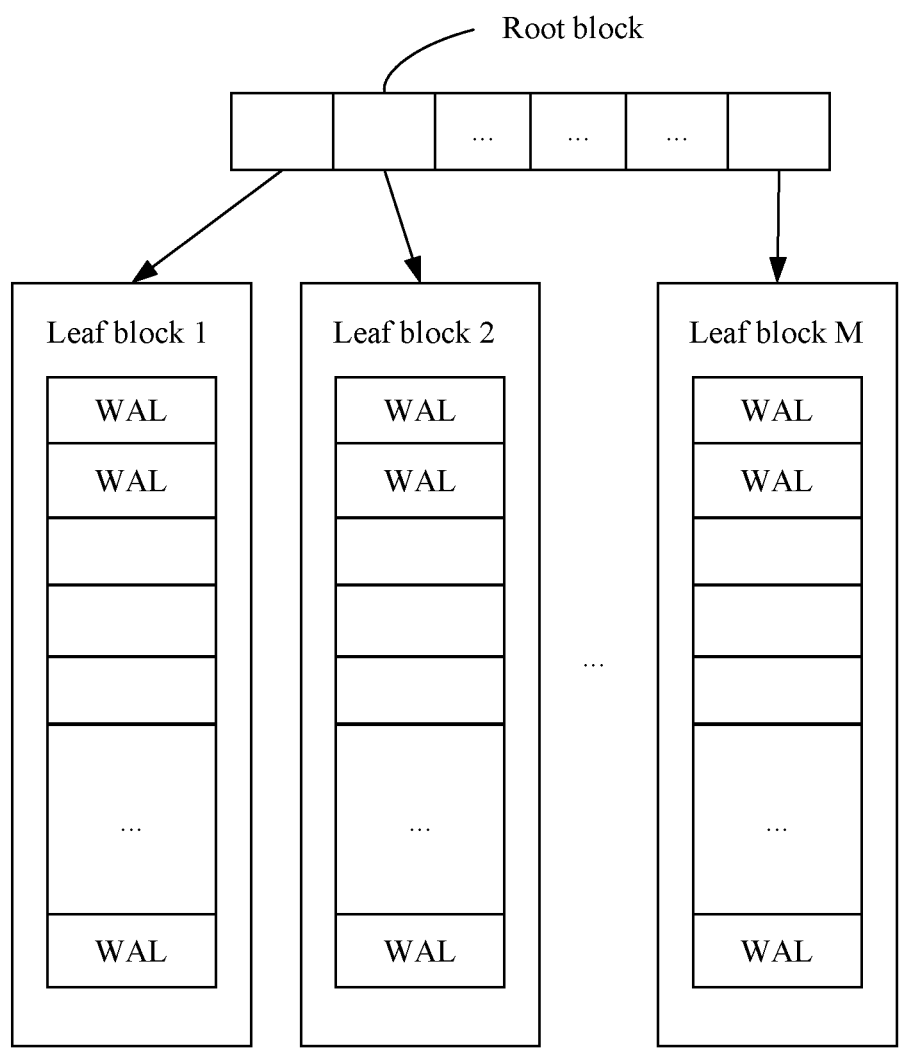
FIG. 1 shows an organizational structure of a WAL in a storage system.

Based on the organizational structure of the WAL described above with reference to FIG. 1, it can be seen that, each stored WAL corresponds to one execution result. When a to-be-processed WAL in a leaf block is being processed, whether to-be-stored WALs meet a replay condition or a deletion condition needs to be determined one by one. To be specific, when an execution result corresponding to the to-be-processed WAL is "uncompleted", it indicates that the to-be-processed WAL meets the replay condition, and the to-be-processed WAL needs to be replayed, and when the execution result corresponding to the to-be-processed WAL is "completed", it indicates that the to-be-processed WAL meets the deletion condition, and the to-be-processed WAL can be deleted. In such a manner of "determining one by one and processing one by one", the WAL can only be replayed or deleted at a granularity of per WAL, and consequently a process of replaying or deleting the WAL is relatively complex.

To simplify the process of replaying or deleting the WAL, the embodiments of this disclosure provide, based on a new organizational structure of a WAL, a method and an apparatus for processing a WAL, to organize a plurality of WALs in a form of a WAL set key-value pair. Based on this new organizational structure of the WAL, a WAL stored in the WAL set key-value pair is replayed or deleted at a granularity of the WAL set key-value pair.

The following describes the technical solutions in this disclosure with reference to the accompanying drawings. For ease of understanding, a storage system to which the embodiments of this disclosure are applicable and a status of a WAL set key-value pair are first described with reference to FIG. 1 and FIG. 2.

Figure 2:
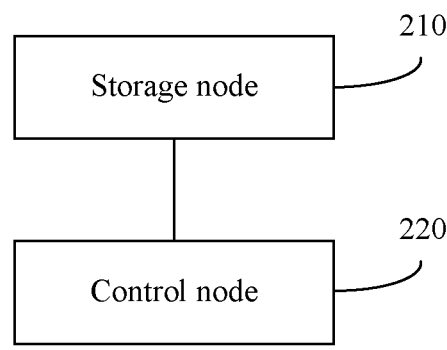
FIG. 2 is a schematic architectural diagram of a key-value pair-based storage system.

FIG. 2 is a schematic architectural diagram of a key-value pair-based storage system to which an embodiment of this disclosure is applicable. It should be understood that this embodiment of this disclosure may also be applicable to another storage system. This is not limited in this embodiment of this disclosure. The storage system shown in FIG. 2 includes a storage node 210 and a control node 220.

The storage node 210 is also referred to as a storage device, and is configured to provide storage space for data (for example, a WAL) in the storage system. For example, the storage device may be a storage device of each of a plurality of computers in a cluster system.

Further, data stored on the storage node may be stored in a data structure of a key-value pair. The key-value pair includes both a key and a value, and is a storage unit in a KV storage technology. For example, the key may be a label of the key-value pair, and is used to retrieve the key-value pair or retrieve a value, and the value may be valid data that needs to be stored. The key may be generated based on the value. For example, a hash operation is performed on the value, and an operation result is used as the value of the key-value pair. Compared with file storage or block storage, a storage manner of the key-value pair has higher storage and reading efficiency.

The control node 220 is configured to receive a data processing request sent by a user using a client in order to perform data processing on the data on the storage node, for example, perform a read/write operation. For example, the control node 220 may be a controller in each of the plurality of computers in the cluster system.

It should be noted that, in the cluster system including the plurality of computers, storage devices of the computers may be associated with each other at a logical level, to form a "shared storage device" such that a control node in each of the plurality of computers can access data stored in the "shared storage device".

Figure 3:
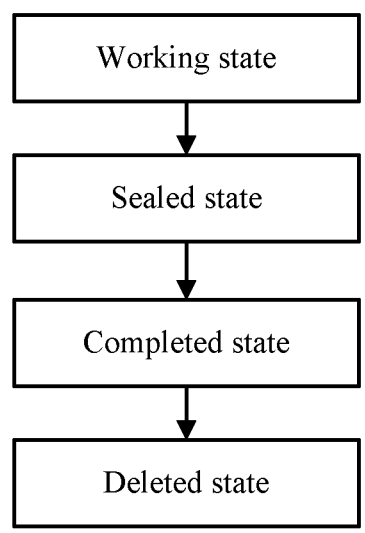
FIG. 3 is a schematic block diagram of a status of a WAL set key-value pair according to an embodiment of this disclosure.

FIG. 3 is a schematic block diagram of a status of a WAL set key-value pair according to an embodiment of this disclosure. The WAL set key-value pair shown in FIG. 3 is used to store a plurality of WALs, and the status of the WAL set key-value pair includes a working state, a sealed state, a completed state, and a deleted state.

Working state: A new to-be-stored WAL can still be stored in a WAL set key-value pair in the working state. Generally, when a WAL set key-value pair is being created, a status of the WAL set key-value pair is the working state.

Sealed state: No new to-be-stored WAL can be added to a WAL set key-value pair in the sealed state.

It should be noted that, the WAL set key-value pair may be switched from the working state to the sealed state when a preset rule 1 is met. The preset rule 1 may be that when a quantity of WALs stored in the WAL set key-value pair reaches a preset quantity or a time period in which the WAL set key-value pair is in the working state exceeds preset duration, the status of the WAL set key-value pair is switched from the working state to the sealed state, to accelerate replay of the WAL.

Completed state: An execution result of a transaction recorded in a WAL in a WAL set key-value pair in the completed state is "completed". That is, either execution of the transaction recorded in the WAL in the WAL set key-value pair in the completed state is completed through replaying, or execution of the transaction recorded in the WAL has originally been completed.

Deleted state: In a status key-value pair, when a status of a WAL set key-value pair is the deleted state, it indicates that the WAL set key-value pair has been deleted.

It should be noted that, in a process of clearing the WAL set key-value pair, the WAL set key-value pair in the completed state is deleted, and in the status key-value pair, the deleted WAL set key-value pair is marked as the deleted state.

Figure 4:
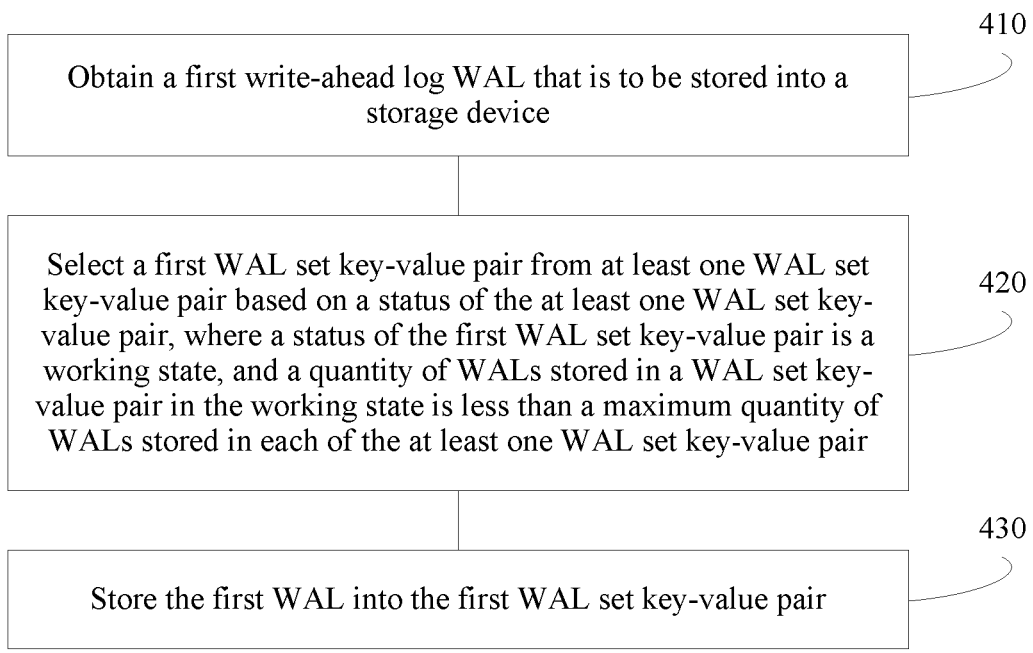
FIG. 4 is a schematic flowchart of a method for processing a WAL according to an embodiment of this disclosure.

The method and the apparatus for processing a WAL according to the embodiments of this disclosure are described below with reference to FIG. 4 based on the architectural diagram of the storage system shown in FIG. 2. FIG. 4 is a schematic flowchart of a method for processing a WAL according to an embodiment of this disclosure. It should be understood that the method shown in FIG. 4 may be performed by the control node shown in FIG. 2. The method shown in FIG. 4 may be applied to a storage device, the storage device may be the storage device shown in FIG. 2, the storage device stores at least one WAL set key-value pair, the at least one WAL set key-value pair is used to store a plurality of WALs, and the method shown in FIG. 4 includes step 410 to step 430.

410. Obtain a first WAL that is to be stored into the storage device.

Further, the first WAL may be stored as a key-value pair. A key of a WAL is used to uniquely determine one WAL, and a value of the WAL is used to record a specific transaction, for example, modified data.

420. Select a first WAL set key-value pair from the at least one WAL set key-value pair based on a status of the at least one WAL set key-value pair, where a status of the first WAL set key-value pair is a working state, and a quantity of WALs stored in a WAL set key-value pair in the working state is less than a maximum quantity of WALs stored in each of the at least one WAL set key-value pair.

It should be noted that a status of the WAL set key-value pair may be stored in a value of each WAL set key-value pair, and the status of the WAL set key-value pair may alternatively be separately stored in a status key-value pair, and the status key-value pair may be used to store the status of the WAL set key-value pair.

Optionally, when a status of a WAL is stored in the status key-value pair, the storage device stores at least one status key-value pair, the at least one status key-value pair is used to store the status of the at least one WAL set key-value pair, and the selecting a first WAL set key-value pair from the at least one WAL set key-value pair based on a status of the at least one WAL set key-value pair includes selecting the first WAL set key-value pair from the at least one WAL set key-value pair based on the status that is of the at least one WAL set key-value pair and that is stored in the at least one status key-value pair.

In this embodiment of this disclosure, a status of a WAL set key-value pair is stored in the status key-value pair. To be specific, the status of the WAL set key-value pair is stored in the status key-value pair at a granularity of the WAL set key-value pair such that WAL set key-value pairs in different statuses can be directly searched for by querying the status key-value pair. Processing WALs in the WAL set key-value pairs in different statuses at a granularity of the WAL set key-value pair helps simplify a process of processing the WAL.

Further, the status key-value pair may store statuses of a plurality of WAL set key-value pairs, that is, a quantity of status key-value pairs is less than a quantity of WAL set key-value pairs. Therefore, when the status of the WAL set key-value pair is queried using the status key-value pair, time for querying the status of the WAL set key-value pair can be reduced.

It should be noted that the selecting the first WAL set key-value pair from the at least one WAL set key-value pair based on the status that is of the at least one WAL set key-value pair and that is stored in the at least one status key-value pair may be traversing statuses of all WAL set key-value pairs stored in the at least one status key-value pair, and selecting the first WAL set key-value pair from the at least one WAL set key-value pair. The selecting the first WAL set key-value pair from the at least one WAL set key-value pair based on the status that is of the at least one WAL set key-value pair and that is stored in the at least one status key-value pair may alternatively be selecting a WAL set key-value pair in the working state as the first WAL set key-value pair based on a WAL set key-value pair status stored in a status key-value pair indicated by a first cursor. Further, the storage device stores a first cursor key-value pair, and a WAL set key-value pair status recorded in a status key-value pair corresponding to the first cursor key-value pair includes the working state. The selecting the first WAL set key-value pair from the at least one WAL set key-value pair based on the status that is of the at least one WAL set key-value pair and that is stored in the at least one status key-value pair includes determining a first status key-value pair that is in the at least one status key-value pair and that is currently corresponding to the first cursor key-value pair, and selecting a WAL set key-value pair in the working state as the first WAL set key-value pair from a WAL set key-value pair status recorded in the first status key-value pair.

In this embodiment of this disclosure, the first cursor key-value pair corresponds to the WAL set key-value pair in the working state in the at least one status key-value pair, thereby helping improve efficiency of searching the at least one status key-value pair for the WAL set key-value pair in the working state.

Figure 5:
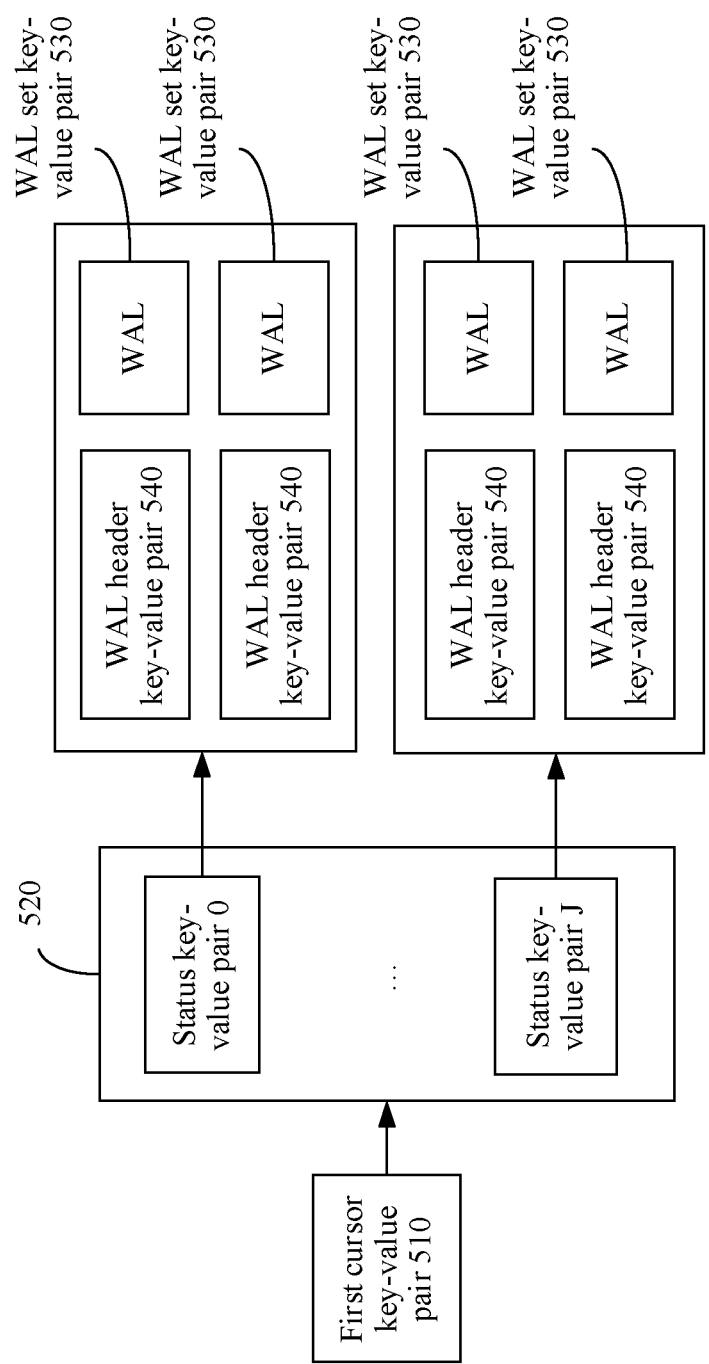
FIG. 5 is a schematic block diagram of an organization manner of a WAL according to an embodiment of this disclosure.

For example, FIG. 5 is a schematic block diagram of an organization manner of a WAL according to an embodiment of this disclosure. The organization manner shown in FIG. 5 includes a cursor key-value pair 510, at least one status key-value pair 520, at least one WAL set key-value pair 530, and at least one WAL header key-value pair 540.

The at least one status key-value pair is used to store a status of a WAL set key-value pair. For example, the status of the WAL set key-value pair is one of a working state, a sealed state, a completed state, and a deleted state.

It should be noted that all the at least one status key-value pair may have a same maximum storage capacity. To be specific, when a quantity of WAL set key-value pair statuses stored in a status key-value pair reaches a preset quantity for the status key-value pair, a next status key-value pair may be created.

It should be further understood that the at least one status key-value pair may be named by a sequence number according to a sequence in which the status key-value pair is generated. Refer to a status key-value pair 0, . . . , and a status key-value pair J shown in FIG. 5, where J is a positive integer. For example, when a quantity of WAL set key-value pair statuses stored in the status key-value pair 0 reaches the foregoing preset quantity for the status key-value pair, a next status key-value pair may be created, and the next status key-value pair is named a status key-value pair 1.

The cursor key-value pair is used to store at least one cursor key-value pair, and the cursor key-value pair provides a capability of browsing one or more lines of data forward or backward in a data set at a time. The cursor key-value pair may include a first cursor key-value pair, a second cursor key-value pair, and a third cursor key-value pair in the following descriptions.

In this embodiment of this disclosure, the cursor key-value pair may correspond to any one of the at least one status key-value pair. Further, in the cursor key-value pair, a sequence number (that is, a key of the status key-value pair) of the status key-value pair may be used as a value of the cursor key-value pair such that the cursor key-value pair corresponds to the status key-value pair. For example, when a sequence number of the first status key-value pair is used as a value of the first cursor key-value pair, a first cursor corresponds to a first status file.

The at least one WAL set key-value pair is used to store a WAL.

The at least one WAL header key-value pair is in one-to-one correspondence with the at least one WAL set key-value pair, and is used to store an execution result corresponding to each WAL in a WAL set key-value pair corresponding to a WAL header key-value pair.

It should be noted that the at least one WAL header key-value pair is in one-to-one correspondence with the at least one WAL set key-value pair, and a key of a WAL header key-value pair in the at least one WAL header key-value pair may be stored in a value of a WAL set key-value pair corresponding to the WAL header key-value pair, or a key of a WAL set key-value pair in the at least one WAL set key-value pair may be stored in a value of a WAL header key-value pair corresponding to the WAL set key-value pair.

Figure 6:
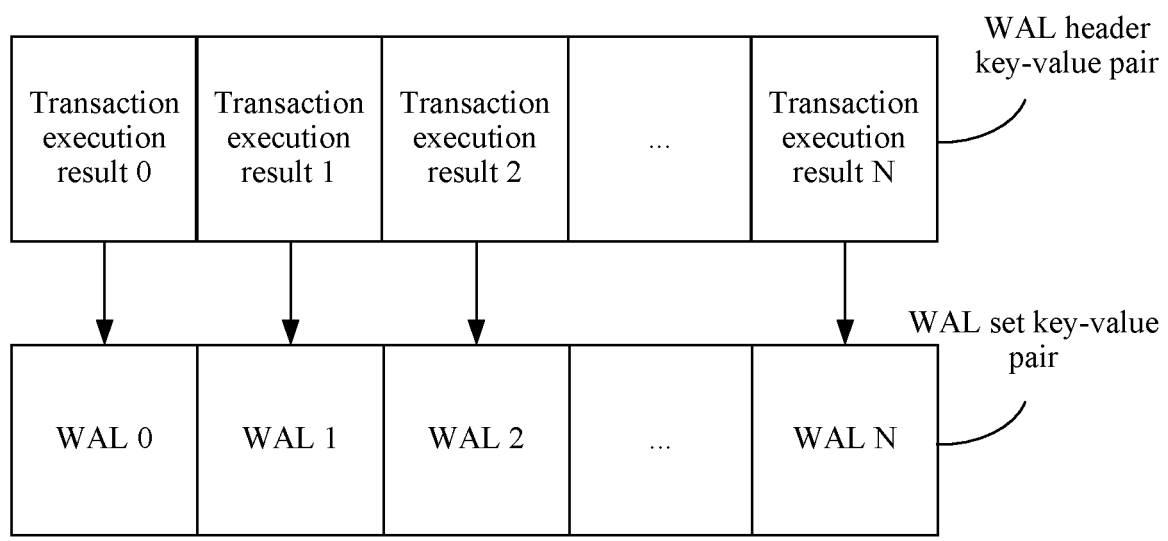
FIG. 6 is a schematic block diagram of a WAL and an execution result of a transaction recorded in the WAL according to an embodiment of this disclosure.

It should be further understood that, an execution result of a transaction recorded in the WAL stored in the WAL header key-value pair may correspond to the WAL stored in the WAL set key-value pair based on a number of the execution result and a number of the WAL. For example, FIG. 6 is a schematic block diagram of a WAL and an execution result of a transaction recorded in the WAL according to an embodiment of this disclosure. In FIG. 6, a WAL set key-value pair stores N WALs, and a WAL header key-value pair stores N execution results of transactions. A transaction execution result of a transaction recorded in a WAL numbered N is stored in an execution result numbered N of a transaction, where N is a positive integer.

It should be noted that FIG. 5 is merely an example of the organization manner of the WAL in this embodiment of this disclosure. In this embodiment of this disclosure, the organization manner shown in FIG. 5 may further be transformed. For example, the execution result of the transaction recorded in the WAL may be directly stored after the WAL corresponding to the execution result. That is, a WAL file may simultaneously store the WAL and the execution result of the transaction recorded in the WAL. In this case, a value of the status key-value pair may store only the key of the WAL set key-value pair.

For another example, in the organization manner of the WAL shown in FIG. 5, the WAL and the execution result of the transaction recorded in the WAL are respectively stored in a WAL set key-value pair and a WAL header key-value pair. The foregoing status file may store only the key of a WAL set key-value pair when a value of the WAL set key-value pair includes a key of a WAL header key-value pair corresponding to the WAL set key-value pair. The foregoing status file may store only the key of a WAL header key-value pair when a value of the WAL header key-value pair includes a key of a WAL set key-value pair corresponding to the WAL header key-value pair. That is, the key of the WAL header key-value pair indirectly corresponds to the WAL set key-value pair.

Optionally, a value of each of the at least one status key-value pair includes keys of at least some of the at least one WAL set key-value pair, and WAL set key-value pair statuses corresponding to the keys of the at least some WAL set key-value pairs.

Optionally, a value of each of the at least one WAL set key-value pair includes a plurality of WALs.

Optionally, in an embodiment, when the storage device stores a first cursor key-value pair and at least one WAL set key-value pair, and the status of the WAL set key-value pair is not separately stored in the status key-value pair, the first cursor may directly correspond to the first WAL set key-value pair in the at least one WAL set key-value pair. The status of the first WAL set key-value pair is the working state. For example, a key of the first WAL set key-value pair is stored in a value of the first cursor key-value pair.

430. Store the first WAL into the first WAL set key-value pair.

In this embodiment of this disclosure, the plurality of WALs are stored in the WAL set key-value pair such that in a process of replaying or deleting the WAL, the WAL can be replayed or deleted at a granularity of the WAL set key-value pair, thereby avoiding a other approaches problem that WALs can only be processed one by one, and helping simplify the process of replaying or deleting the WAL stored in the storage device.

Optionally, in an embodiment, the storage device further stores a second cursor key-value pair, a WAL set key-value pair status recorded in a status key-value pair corresponding to the second cursor key-value pair includes the sealed state, and the determining a status of a to-be-processed target WAL set key-value pair in the at least one WAL set key-value pair from the status key-value pair further includes determining a second status key-value pair that is in the status key-value pair and that is currently corresponding to the second cursor key-value pair, where the second status key-value pair records the status of the target WAL set key-value pair, and determining, from a WAL set key-value pair status recorded in the second status key-value pair, that the status of the target WAL set key-value pair is the sealed state.

That is, the second cursor key-value pair is used to correspond to a WAL set key-value pair in the sealed state in the at least one WAL set key-value pair. After a status of a second WAL set key-value pair corresponding to the second cursor key-value pair is the completed state, the second cursor key-value pair may correspond to another WAL set key-value pair in the sealed state in the at least one WAL set key-value pair, until all WAL set key-value pairs in the sealed state in the storage device are traversed using the second cursor key-value pair.

It should be noted that, in this embodiment of this disclosure, a direction in which the second cursor key-value pair moves in the at least one status key-value pair is not limited. For example, the second cursor key-value pair may move, in the at least one status key-value pair and according to the sequence in which the status key-value pair is generated, from an earliest generated status key-value pair to the status key-value pair corresponding to the first cursor key-value pair, and traverse the at least one status key-value pair. The second cursor key-value pair may alternatively move, in the at least one status key-value pair and according to the sequence in which the status key-value pair is generated, from the status key-value pair corresponding to the first cursor key-value pair to the earliest generated status key-value pair, and traverse the at least one status key-value pair. That is, the method further includes making the second cursor key-value pair correspond to a fourth status key-value pair in the at least one WAL set key-value pair, where the fourth status key-value pair is a next status key-value pair generated after the second status key-value pair.

In this embodiment of this disclosure, the second cursor key-value pair corresponds to the WAL set key-value pair in the sealed state in the at least one status key-value pair, thereby helping improve efficiency of searching the at least one status key-value pair for the WAL set key-value pair in the sealed state.

Optionally, in an embodiment, the storage device further stores a third cursor key-value pair, a WAL set key-value pair status recorded in a status key-value pair corresponding to the third cursor key-value pair includes the completed state, and determining a status of a to-be-processed target WAL set key-value pair in the at least one WAL set key-value pair from the at least one status key-value pair further includes determining a third status key-value pair that is in the status key-value pair and that is currently corresponding to the third cursor key-value pair, where the third status key-value pair records the status of the target WAL set key-value pair, and determining, from a WAL set key-value pair status recorded in the third status key-value pair, that the status of the target WAL set key-value pair is the completed state.

Further, the third cursor key-value pair is used to correspond to a WAL set key-value pair in the completed state in the at least one WAL set key-value pair. After a status of a third WAL set key-value pair corresponding to the third cursor key-value pair is the completed state, the third cursor key-value pair may correspond to another WAL set key-value pair in the completed state in the at least one WAL set key-value pair, until all WAL set key-value pairs in the completed state in the storage device are traversed using the third cursor key-value pair.

It should be noted that, in this embodiment of this disclosure, a direction in which the third cursor key-value pair moves in the at least one status key-value pair is not limited. For example, the third cursor key-value pair may move, in the at least one status key-value pair and according to the sequence in which the status key-value pair is generated, from an earliest generated status key-value pair to the status key-value pair corresponding to the first cursor key-value pair, and traverse the at least one status key-value pair. The third cursor key-value pair may alternatively move, in the at least one status key-value pair and according to the sequence in which the status key-value pair is generated, from the status key-value pair corresponding to the first cursor key-value pair to the earliest generated status key-value pair, and traverse the at least one status key-value pair. That is, the method includes making the third cursor key-value pair correspond to a fifth status key-value pair in the at least one WAL set key-value pair, where the fifth status key-value pair is a next status key-value pair generated after the third status key-value pair.

In this embodiment of this disclosure, the third cursor key-value pair corresponds to the WAL set key-value pair in the completed state in the at least one status key-value pair, thereby helping improve efficiency of searching the at least one status key-value pair for the WAL set key-value pair in the completed state.

Optionally, after deleting the WAL set key-value pair in the completed state, the method further includes modifying, in the third status key-value pair, a status of the WAL set key-value pair in the completed state to the deleted state.

It should be noted that, after the WAL set key-value pair in the completed state is deleted, the status of the deleted WAL set key-value pair can be directly deleted from the third status key-value pair, or after deleting the WAL set key-value pair in the completed state, the method further includes modifying, in the third status key-value pair, the status of the WAL set key-value pair in the completed state to the deleted state, to obtain more detailed information about the status of the WAL set key-value pair by checking the status key-value pair sub sequently.

Optionally, the key of the first WAL set key-value pair may be associated with an identifier of a control node that writes the WAL to the first WAL set key-value pair, and an identifier of a check point. That is, one WAL set key-value pair, that is, the first WAL set key-value pair, may be determined based on the identifier of the control node and the identifier of the check point.

Further, the check point may be understood as a node that copies the WAL set key-value pair in the storage device to a disk.

It should be noted that a naming manner of the WAL set key-value pair may be used to support only a storage system to which one WAL is written each time.

Further, a plurality of concurrency identifiers may be preset, and a quantity of concurrency identifiers is equal to a quantity of WALs that can be simultaneously stored. For example, five concurrency identifiers are preset, and it may be understood that each control node may simultaneously store five WALs to the storage device.

Figure 7:
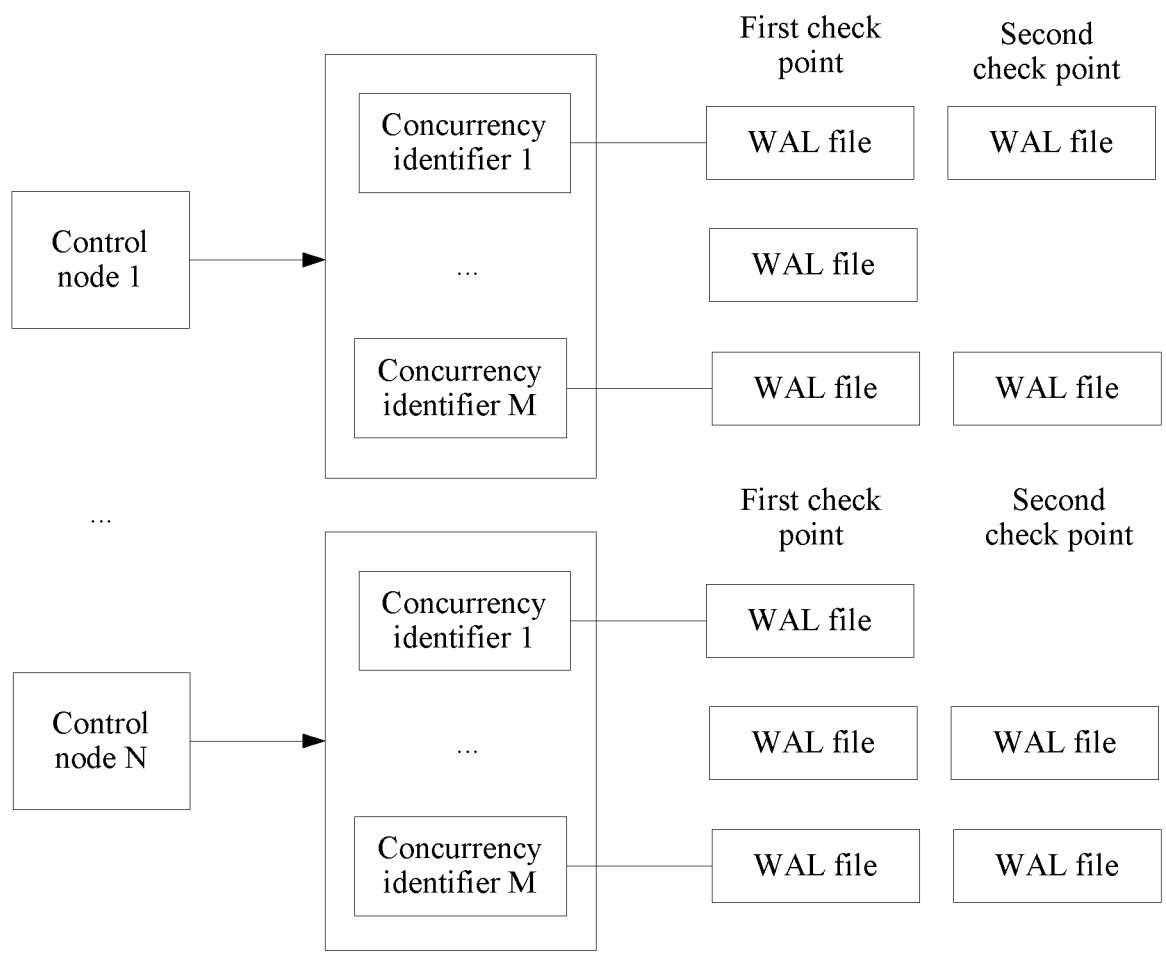
FIG. 7 is a schematic block diagram of a correspondence between a control node, a concurrency identifier, a check point, and a WAL set key-value pair according to an embodiment of this disclosure.

FIG. 7 is a schematic block diagram of a correspondence between a control node, a concurrency identifier, a check point, and a WAL set key-value pair according to an embodiment of this disclosure. M concurrency identifiers are preset for each of N control nodes, each concurrency identifier corresponds to one WAL set key-value pair in a working state, and a check point corresponding to each WAL set key-value pair in the working state is a current check point (referring to a first check point shown in FIG. 7). The current check point is switched from a check point corresponding to the WAL set key-value pair to a next check point when a status of a WAL set key-value pair is switched from the working state to a sealed state. For example, the current check point is updated to the first check point from a second check point when the WAL set key-value pair is switched from the working state to the sealed state, the first check point is a next check point of the second check point.

Optionally, in an embodiment, a first concurrency identifier and a second concurrency identifier are preset in the storage device, the first WAL corresponds to the first concurrency identifier, the first WAL set key-value pair corresponds to the first concurrency identifier, the first status key-value pair stores a plurality of WAL set key-value pairs in the working state, the plurality of WAL set key-value pairs in the working state include the first WAL set key-value pair and the second WAL set key-value pair, and before the selecting the first WAL set key-value pair from the first status key-value pair corresponding to the first cursor key-value pair, the method further includes obtaining the second WAL set key-value pair that is to be stored into the storage device, where the second WAL set key-value pair corresponds to the second concurrency identifier, selecting the second WAL set key-value pair corresponding to the second concurrency identifier from the first status key-value pair corresponding to the first cursor key-value pair, and storing a second WAL into the second WAL set key-value pair in a process of storing the first WAL into the first WAL set key-value pair.

Further, when a plurality of to-be-stored WALs need to be stored into the storage device, different concurrency identifiers may be configured for the plurality of WALs, and a WAL set key-value pair corresponding to each of the plurality of WALs is determined based on WAL set key-value pairs in the working state that are corresponding to the different concurrency identifiers.

It should be noted that a concurrency identifier may be obtained for the to-be-stored WAL through hash calculation such that the plurality of to-be-stored WALs correspond to a plurality of preset concurrency identifiers.

In this embodiment of this disclosure, different WAL set key-value pairs in the working state can be simultaneously selected for the plurality of to-be-stored WALs based on the concurrency identifiers such that the plurality of WALs can be simultaneously stored into the storage device, thereby helping improve WAL storage efficiency.

The method for processing a WAL in the embodiments of this disclosure is described above in detail with reference to FIG. 1 to FIG. 7. An apparatus according to an embodiment of this disclosure is described below in detail with reference to FIG. 8 to FIG. 10. It should be understood that apparatuses shown in FIG. 8 to FIG. 10 may implement steps in the foregoing method. For brevity, details are not described herein again.

Figure 8:
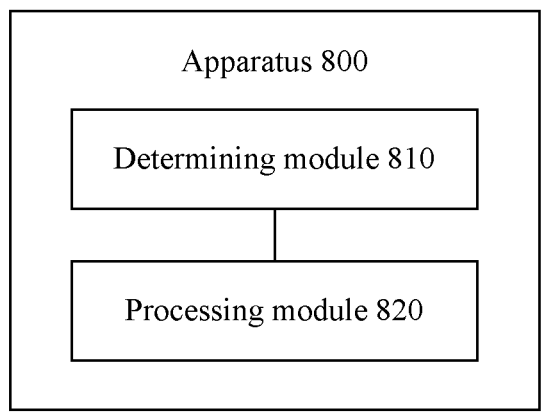
FIG. 8 is a schematic structural diagram of an apparatus for processing a WAL according to an embodiment of this disclosure.

FIG. 8 is a schematic structural diagram of an apparatus 800 for processing a WAL according to an embodiment of this disclosure. The apparatus 800 is coupled to a storage device, the storage device records a plurality of WAL set key-value pairs and a status key-value pair, each of the plurality of WAL set key-value pairs is used to record a plurality of WALs, the status key-value pair is used to record statuses of at least some of the plurality of WAL set key-value pairs, and statuses of the plurality of WAL set key-value pairs include a completed state or a sealed state, where a WAL set key-value pair in the sealed state is forbidden to record a new WAL, and execution of all WALs in a WAL set key-value pair in the completed state is completed. The apparatus 800 includes a determining module 810 and a processing module 820.

The determining module 810 is configured to determine a status of a to-be-processed target WAL set key-value pair in the at least one WAL set key-value pair from the status key-value pair.

The processing module 820 is configured to, for a target WAL set key-value that is in the sealed state and that is determined by the determining module, read the target WAL set key-value pair, replay all uncompleted WALs in the target WAL set key-value pair, and after the replay is completed, modify a status of the target WAL set key-value to the completed state.

The processing module is further configured to delete the target WAL set key-value pair that is in the completed state and that is determined by the determining module.

Optionally, in an embodiment, a value of each of the at least one status key-value pair includes keys of at least some of the at least one WAL set key-value pair, and WAL set key-value pair statuses corresponding to the keys of the at least some WAL set key-value pairs.

Optionally, in an embodiment, a value of each of the at least one WAL set key-value pair includes a plurality of WALs.

Optionally, in an embodiment, the storage device further stores a second cursor key-value pair, a WAL set key-value pair status recorded in a status key-value pair corresponding to the second cursor key-value pair includes the sealed state, and the processing module 820 is further configured to determine a second status key-value pair that is in the status key-value pair and that is currently corresponding to the second cursor key-value pair, where the second status key-value pair records the status of the target WAL set key-value pair, and determine, from a WAL set key-value pair status recorded in the second status key-value pair, that the status of the target WAL set key-value pair is the sealed state.

Optionally, in an embodiment, the storage device further stores a third cursor key-value pair, a WAL set key-value pair status recorded in a status key-value pair corresponding to the third cursor key-value pair includes the completed state, and the processing module 820 is further configured to determine a third status key-value pair that is in the status key-value pair and that is currently corresponding to the third cursor key-value pair, where the third status key-value pair records the status of the target WAL set key-value pair.

Optionally, in an embodiment, after replaying the WAL in the target WAL set key-value pair, the processing module is further configured to modify, in the second status key-value pair, the status of the target WAL set key-value pair from the sealed state to the completed state.

Optionally, in an embodiment, after deleting the target WAL set key-value pair, the processing module 820 is further configured to modify, in the third status key-value pair, the status of the target WAL set key-value pair from the completed state to a deleted state.

Optionally, in an embodiment, the processing module is further configured to modify the second cursor key-value pair that corresponds to the second status key-value pair to a fourth status key-value pair that corresponds to the at least one WAL set key-value pair, and the fourth status key-value pair is a next status key-value pair generated after the second status key-value pair.

Optionally, in an embodiment, the processing module is further configured to modify the third cursor key-value pair that corresponds to the third status key-value pair to a fifth status key-value pair that corresponds to the at least one WAL set key-value pair, and the fifth status key-value pair is a next status key-value pair generated after the third status key-value pair.

Figure 9:
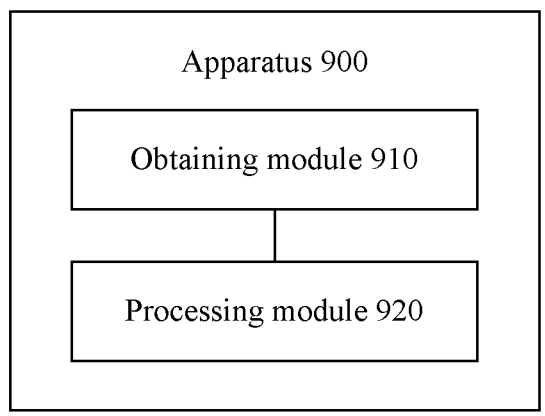
FIG. 9 is a schematic structural diagram of another apparatus for processing a WAL according to an embodiment of this disclosure.

FIG. 9 is a schematic structural diagram of another apparatus for processing a WAL according to an embodiment of this disclosure. The apparatus 900 in FIG. 9 includes an obtaining module 910 and a processing module 920. The apparatus 900 in FIG. 9 is coupled to a storage device, the storage device stores at least one WAL set key-value pair, and the at least one WAL set key-value pair is used to store a plurality of WALs.

The obtaining module 910 is configured to obtain a first WAL that is to be stored into the storage device.

The processing module 920 is configured to select a first WAL set key-value pair from the at least one WAL set key-value pair based on a status of the at least one WAL set key-value pair, where a status of the first WAL set key-value pair is a working state, and a WAL set key-value pair in the working state is used to store a newly received WAL.

The processing module 920 is further configured to store the first WAL obtained by the obtaining module into the first WAL set key-value pair.

Optionally, a status of the first WAL set key-value pair is the working state, and a quantity of WALs stored in a WAL set key-value pair in the working state is less than a maximum quantity of WALs stored in each of the at least one WAL set key-value pair.

Optionally, in an embodiment, the storage device stores at least one status key-value pair, the at least one status key-value pair is used to store the status of the at least one WAL set key-value pair, and the processing module is further configured to select the first WAL set key-value pair from the at least one WAL set key-value pair based on the status that is of the at least one WAL set key-value pair and that is stored in the at least one status key-value pair.

Optionally, in an embodiment, the storage device stores a first cursor key-value pair, a WAL set key-value pair status recorded in a status key-value pair corresponding to the first cursor key-value pair includes the working state, and the processing module 920 is further configured to determine a first status key-value pair that is in the at least one status key-value pair and that is currently corresponding to the first cursor key-value pair, and select, from a WAL set key-value pair status recorded in the first status key-value pair, a WAL set key-value pair in the working state as the first WAL set key-value pair.

Optionally, in an embodiment, a value of each of the at least one status key-value pair includes keys of at least some of the at least one WAL set key-value pair, and WAL set key-value pair statuses corresponding to the keys of the at least some WAL set key-value pairs.

Optionally, in an embodiment, a value of each of the at least one WAL set key-value pair includes a plurality of WALs.

Optionally, in an embodiment, the storage device further stores a second cursor key-value pair, a WAL set key-value pair status recorded in a status key-value pair corresponding to the second cursor key-value pair includes the sealed state, and the processing module 920 is further configured to determine a second status key-value pair that is in the at least one status key-value pair and that is currently corresponding to the second cursor key-value pair, determine a WAL set key-value pair in the sealed state from a WAL set key-value pair status recorded in the second status key-value pair, and replay a to-be-replayed WAL in the WAL set key-value pair in the sealed state, and modify, in the second status key-value pair, the status of the WAL set key-value pair in the sealed state to the completed state when all WALs in the WAL set key-value pair in the sealed state are in a replay-completed state or a state indicating that replay is not required.

Optionally, in an embodiment, the storage device further stores a third cursor key-value pair, a WAL set key-value pair status recorded in a status key-value pair corresponding to the third cursor key-value pair includes the completed state, and the processing module 920 is further configured to determine a third status key-value pair that is in the at least one status key-value pair and that is currently corresponding to the third cursor key-value pair, determine, from a WAL set key-value pair status recorded in the third status key-value pair, a WAL set key-value pair in the completed state in the third status key-value pair, and delete the WAL set key-value pair in the completed state, and modify, in the third status key-value pair, a status of the WAL set key-value pair in the completed state to a deleted state.

Optionally, in an embodiment, after deleting the WAL set key-value pair in the completed state, the processing module 920 is further configured to modify, in the third status key-value pair, the status of the WAL set key-value pair in the completed state to the deleted state.

Optionally, in an embodiment, the processing module 920 is further configured to make the second cursor key-value pair correspond to a fourth status key-value pair in the at least one WAL set key-value pair, where the fourth status key-value pair is a next status key-value pair generated after the second status key-value pair.

Optionally, in an embodiment, the processing module 920 is further configured to make the third cursor key-value pair correspond to a fifth status key-value pair in the at least one WAL set key-value pair, where the fifth status key-value pair is a next status key-value pair generated after the third status key-value pair.

In an optional embodiment, the apparatus 800 may alternatively be a controller 1000. Further, the determining module 810 and the processing module 820 may be a processor 1020. The controller 1000 may further include a memory 1010, and the memory 1010 may be the storage device in the apparatus 800, as shown in FIG. 10.

In an optional embodiment, the apparatus 900 may alternatively be a controller 1000. Further, the obtaining module 910 may be an input/output interface 1030. The processing module 920 may be a processor 1020. The controller 1000 may further include a memory 1010, and the memory may be the storage device in the apparatus 900, as shown in FIG. 10.

Figure 10:
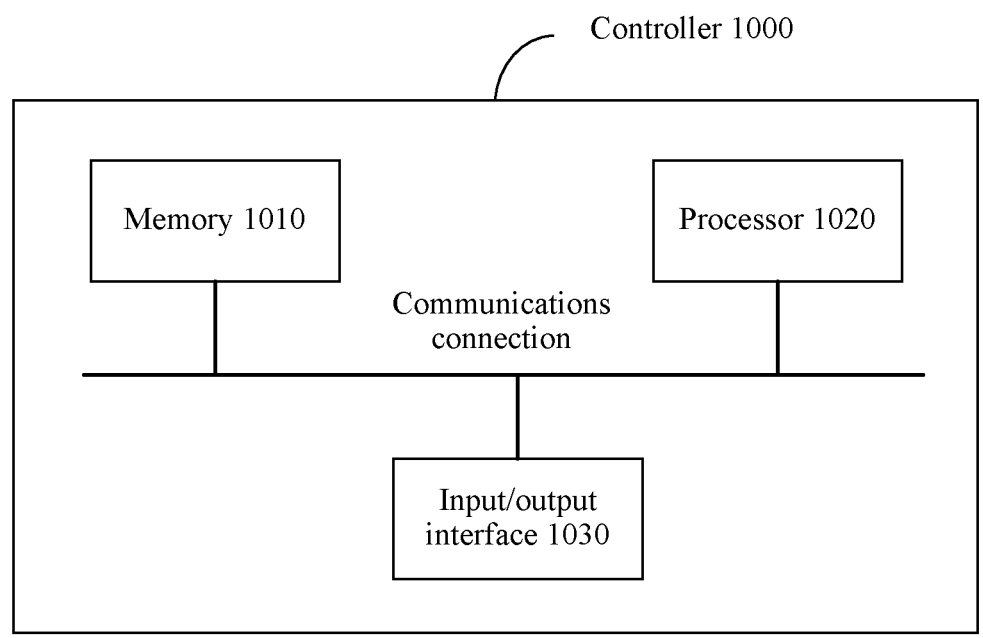
FIG. 10 is a schematic block diagram of a controller according to another embodiment of this disclosure.

FIG. 10 is a schematic block diagram of a controller according to another embodiment of this disclosure. A controller 1000 shown in FIG. 10 may include a memory 1010, a processor 1020, and an input/output interface 1030. The memory 1010, the processor 1020, and the input/output interface 1030 are connected using an internal connection channel, the memory 1010 is configured to store a program instruction, and the processor 1020 is configured to execute the program instruction stored in the memory 1020, to control the input/output interface 1030 to receive input data and information, and output data such as an operation result.

It should be understood that, in this embodiment of this disclosure, the processor 1020 may be a general-purpose central processing unit (CPU), a microprocessor, an application-specific integrated circuit (ASIC), or one or more integrated circuits, and is configured to execute a related program to implement the technical solutions provided in this embodiment of this disclosure.

The memory 1010 may include a read-only memory (ROM) and a random-access memory (RAM), and provide an instruction and data for the processor 1020. A part of the processor 1020 may further include a non-volatile RAM (NVRAIVI). For example, the processor 1020 may further store information about a device type.

In an implementation process, each step of the foregoing method may be completed using an integrated logic circuit of hardware in the processor 1020 or an instruction in a form of software. The methods disclosed with reference to the embodiments of this disclosure may be directly performed and completed using a hardware processor, or may be performed and completed using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1010, and the processor 1020 reads information in the memory 1010 and implements the steps of the foregoing method in combination with hardware of the processor 1020. To avoid repetition, details are not described herein.

It should be understood that, in this embodiment of this disclosure, the processor may be a CPU, or the processor may be another general-purpose processor, a digital signal processor (DSP), an ASIC, a field programmable gate array (FPGA) or another programmable logic device, a discrete gate or transistor logic device, a discrete hardware component, or the like. The general purpose processor may be a microprocessor or the processor may be any conventional processor, or the like.

Optionally, in an embodiment, the determining module and the processing module shown in FIG. 8 may further run on a program module in the processor shown in FIG. 10.

Optionally, in an embodiment, the obtaining module and the processing module shown in FIG. 9 may further run on the program module in the processor shown in FIG. 10.

It should be understood that in the embodiments of this disclosure, "B corresponding to A" indicates that B is associated with A, and B may be determined based on A. However, it should further be understood that determining B based on A does not mean that B is determined based on A only, and B may also be determined based on A and/or other information.

It should be understood that the term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital video disc (DVD)), a semiconductor medium (for example, a solid state disk (SSD), or the like.

The foregoing descriptions are merely specific implementations of this disclosure, but are not intended to limit the protection scope of this disclosure.

What is claimed is:

1. A method for processing a write-ahead log (WAL) in a storage device, wherein the method comprises:
    recording a WAL set key-value pair and a status key-value pair, wherein the status key-value pair records a status of a plurality of WAL set key-value pairs such that WAL set key-value pairs in different statuses can be directly searched by querying the status key-value pair, and wherein the status comprises a sealed state, a complete state, a working state, or a deleted state;
    replaying all uncompleted WALs in the WAL set key-value pair when the status of the WAL set key-value pair is in the sealed state, wherein the WAL set key-value pair in the sealed state is forbidden to record a new WAL, and wherein the WAL set key-value pair records a plurality of WALs;

modifying, in the status key-value pair, the status of the WAL set key-value pair from the sealed state to the completed state; and deleting the WAL set key-value pair in the completed state.

2. The method of claim 1, wherein a value of the status key-value pair comprises a key of the WAL set key-value pair and the status of the WAL set key-value pair corresponding to the key of the WAL set key-value pair.

3. The method of claim 1, further comprising storing a first cursor key-value pair, wherein the status of the WAL set key-value pair recorded in the status key-value pair corresponding to the first cursor key-value pair comprises the sealed state.

4. The method of claim 1, further comprising storing a second cursor key-value pair, wherein the status of the WAL set key-value pair recorded in the status key-value pair corresponding to the second cursor key-value pair comprises the completed state.

5. The method of claim 1, wherein the WAL set key-value pair in the working state records a new WAL.

6. The method of claim 5, wherein a quantity of WALs stored in the WAL set key-value pair in the working state is less than a maximum quantity of WALs.

7. The method of claim 1, wherein a quantity of WALs stored in the WAL set key-value pair in the sealed state is equal to a maximum quantity of WALs.

8. An apparatus for processing a write-ahead log (WAL) in a storage device, wherein the apparatus comprises:

a memory configured to store instructions; and a processor coupled to the memory, wherein the instructions cause the processor to be configured to:

record a WAL set key-value pair and a status key-value pair, wherein the status key-value pair records a status of a plurality of WAL set key-value pairs such that WAL set key-value pairs in different statuses can be directly searched by querying the status key-value pair, and wherein the status comprises a sealed state, a complete state, a working state, or a deleted state;

replay all uncompleted WALs in the WAL set key-value pair when the status of the WAL set key-value pair is in the sealed state, wherein the WAL set key-value pair in the sealed state is forbidden to record a new WAL, and wherein the WAL set key-value pair records a plurality of WALs;

modify, in the status key-value pair, the status of the WAL set key-value from the sealed state to the completed state; and delete the WAL set key-value pair in the completed state.

9. The apparatus of claim 8, wherein a value of the status key-value pair comprises a key of the WAL set key-value pair and the status of the WAL set key-value pair corresponding to the key of the WAL set key-value pair.

10. The apparatus of claim 8, wherein the instructions further cause the processor to be configured to store a first cursor key-value pair, and wherein the status of the WAL set key-value pair recorded in the status key-value pair corresponding to the first cursor key-value pair comprises the sealed state.

11. The apparatus of claim 8, wherein the instructions further cause the processor to be configured to store a second cursor key-value pair, and wherein the status of the WAL set key-value pair recorded in the status key-value pair corresponding to the second cursor key-value pair comprises the completed state.

12. The apparatus of claim 8, wherein the WAL set key-value pair in the working state records a new WAL.

13. The apparatus of claim 12, wherein a quantity of WALs stored in the WAL set key-value pair in the working state is less than a maximum quantity of WALs.

14. The apparatus of claim 8, wherein a quantity of WALs stored in the WAL set key-value pair in the sealed state is equal to a maximum quantity of WALs.

15. A computer program product comprising a non-transitory computer-readable storage medium having computer-executable instructions for processing a write-ahead log (WAL) in a storage device, wherein the computer-executable instructions, when executed by a processor, cause a computer to:

record a WAL set key-value pair and a status key-value pair, wherein the status key-value pair records a status of a plurality of WAL set key-value pairs such that WAL set key-value pairs in different statuses can be directly searched by querying the status key-value pair, and wherein the status comprises a sealed state, a complete state, a working state, or a deleted state;

replay all uncompleted WALs in the WAL set key-value pair when the status of the WAL set key-value pair is in the sealed state, wherein the WAL set key-value pair in the sealed state is forbidden to record a new WAL, and wherein the WAL set key-value pair records a plurality of WALs;

modify, in the status key-value pair, the status of the WAL set key-value from the sealed state to the completed state; and delete the WAL set key-value pair in the completed state.

16. The computer program product of claim 15, wherein a value of the status key-value pair comprises a key of the WAL set key-value pair and the status of the WAL set key-value pair corresponding to the key of the WAL set key-value pair.

17. The computer program product of claim 15, wherein the computer-executable instructions further cause the computer to be configured to store a first cursor key-value pair, and wherein the status of the WAL set key-value pair recorded in the status key-value pair corresponding to the first cursor key-value pair comprises the sealed state.

18. The computer program product of claim 15, wherein the computer-executable instructions further cause the computer to be configured to store a second cursor key-value pair, and wherein the status of the WAL set key-value pair recorded in the status key-value pair corresponding to the second cursor key-value pair comprises the completed state.

19. The computer program product of claim 15, wherein the WAL set key-value pair in the working state records a new WAL, and wherein a quantity of WALs stored in the WAL set key-value pair in the working state is less than a maximum quantity of WALs.

20. The computer program product of claim 15, wherein a quantity of WALs stored in the WAL set key-value pair in the sealed state is equal to a maximum quantity of WALs.

* * * * *